United States Patent
Yagyu et al.

(10) Patent No.: US 6,985,448 B2
(45) Date of Patent: Jan. 10, 2006

(54) DATA TRANSFER SYSTEM CAPABLE OF AVOIDING DOUBLE RECEPTION OF SAME DATA

(75) Inventors: Tomohiko Yagyu, Tokyo (JP); Masahiro Jibiki, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 683 days.

(21) Appl. No.: 09/793,637

(22) Filed: Feb. 27, 2001

(65) Prior Publication Data

US 2001/0017843 A1    Aug. 30, 2001

(30) Foreign Application Priority Data

Feb. 28, 2000    (JP)    .............................. 2000/052445

(51) Int. Cl.
*H04L 12/28*    (2006.01)
(52) U.S. Cl. ...................................... 370/255; 370/221
(58) Field of Classification Search ................ 370/216, 370/217, 218, 219, 220, 221, 222, 225, 228
See application file for complete search history.

(56) References Cited

U.S. PATENT DOCUMENTS

| | | | |
|---|---|---|---|
| 5,742,820 A | * | 4/1998 | Perlman et al. ............. 707/201 |
| 6,535,481 B1 | * | 3/2003 | Andersson et al. ......... 370/225 |
| 6,700,871 B1 | * | 3/2004 | Harper et al. ............... 370/235 |

FOREIGN PATENT DOCUMENTS

| JP | 5-207011 | 8/1993 |
|---|---|---|
| JP | 8-44658 | 2/1996 |
| JP | 8-77127 | 3/1996 |
| JP | 10-51459 | 2/1998 |
| JP | 11-127157 | 5/1999 |
| JP | 11-177573 | 7/1999 |
| JP | 2000-4247 | 1/2000 |

OTHER PUBLICATIONS

Lin, J. et al., "A comparison of the internet multicast routing protocols", Computer Communications, Elsevier Science Publishers B.V., Amsterdam, NL, vol. 22, No. 2, Jan. 25, 1999, pp. 144-155, XP004157082.

Perlman, Radia, "Interconnections: bridges, routers, switches and internetworking protocols, 2$^{nd}$ ed", Sep. 1999, pp. 58-63, XP002187486.

Pansiot, Jean-Jacques et al., "On Routes and Multicast Trees in the Internet", Computer Communication Review, Association for Computing Machinery, New York, US, vol. 28, No. 1, 1998, pp. 41-50, XP000751638.

Perlman, Radia et al., "Pitfalls in the Design of Distributed Routing Algorithms", Computer Communication Review, Association for Computing Machinery, New York, US, vol. 18, No. 4, Aug. 1, 1988, pp. 43-54, XP000619278.

(Continued)

*Primary Examiner*—Chi Pham
*Assistant Examiner*—Derrick W Ferris
(74) *Attorney, Agent, or Firm*—Young & Thompson

(57) ABSTRACT

A data transfer method between a plurality of data transfer apparatuses, is attained by establishing peers between the plurality of data transfer apparatuses to store the established peers in a transfer route configuration data table as transfer route configuration data in each of the plurality of data transfer apparatuses; and by transferring a reception data to specific ones of the plurality of data transfer apparatuses based on the transfer route configuration data in each of the plurality of data transfer apparatuses.

22 Claims, 6 Drawing Sheets

OTHER PUBLICATIONS

Varadarajan, S. et al., "Automatic Fault Detection and Recovery in Real Time Switched Ethernet Networks", Infocom '99, Eighteenth Annual Joint Conference of the IEEE Computer and Communications Societies. Proceedings. IEEE New York, USA, Mar. 21-25, 1999, Piscataway, NJ, USA, IEEE, USA, Mar. 21, 1999, pp. 161-169, XP010323731.

Low, Chor, P., "Loop-free multicast routing with end-to-end delay constraint", Computer Communications, Elsevier Science Publishers B.V., Amsterdam, NL, vol. 22, No. 2, Jan. 25, 1999, pp. 181-192, XP004157085.

Farinacci, Dino, et al. "Multicast Source Discovery Protocol", Internet Draft, draft-ietf-msdq-spec-03.txt, Jan. 2000.

D. Farinacci et al., "Draft-ietf-msdp-spec-00", Dec. 1999, *IETF Internet Draft*, pp. 1-22.

* cited by examiner

DATA TRANSFER SYSTEM CAPABLE OF AVOIDING DOUBLE RECEPTION OF SAME DATA

BACKGROUND OF THE INVENTION

1. Field of the Invention

The present invention relates to a data transfer unit, a data transfer system for transferring data by using a plurality of data transfer units, a data transfer method and a computer-readable recording medium used in the data transfer unit.

2. Description of the Related Art

Conventionally, a data transfer system is known in which a sender transfers data to a plurality of data transfer units directly or via other data transfer units by using another data transfer unit (hereafter referred to as data transfer unit). Such a data transfer system is disclosed, for example, in IETF Internet Draft "draft-ietf-msdp-spec-00", (Dino Farinacci et al., December 1999).

In the conventional data system, if any fault arises in the course of a data transfer route, a new route is determined between a receiver and the sender in order to avoid loop transfer of the data. Therefore, if any fault has occurred in the course of the data transfer route, there is a problem that the receiver can receive no data until the transfer route is restored.

In conjunction with the above description, a reconfugrable multiple interconnection network with a fault endurance is disclosed in Japanese Laid Open Patent Application (JP-A-Heisei 5-207011). In this reference, a network is composed of a switch node 16 arranged in 2(logbN) stages. The value b is the number of input/output ports of the switch node, and the value N is the number of input/output ports of the network. When an additional stage is added, an additional communication path is provided between the input port and the output port of the network.

Also, a transfer control circuit is disclosed in Japanese Laid Open Patent Application (JP-A-Heisei 8-44658). In this reference, the transfer control circuit actively stores transfers data in a storage section through an asynchronous bus. The transfer control circuit includes an output control circuit which is composed of a hazard-free asynchronous circuit which is composed of one or more function executing circuits, and one or more sequence control circuits. The function execution circuit sends out a control signal to the storage section or the asynchronous bus, and carries out control operation to a writing operation. Also, the function execution circuit outputs a response signal in response to the end of the control operation. The sequence control circuit detects the state of the response signal, selects one or more of the function execution circuits to carry out sequence control to the control operation in a reading operation. Also, the sequence control circuit outputs the response signal in response to the end of the sequence control, such that the condition of the competition to the reading operation can be avoided. One or more of the function execution circuit have delay elements and generates the response signal in response to the end of the control operation in which the time to refer to the storage section is guaranteed. The plurality of sequence control circuits wait for the response signals independent and having different time periods. One or more of the plurality of sequence control circuits detect the states of the response signals, and carry out the sequence control regardless of the state of the response signals generated from the function execution circuits after detecting the end of the operation of the function execution circuits.

Also, a data transfer system between processors is disclosed in Japanese Laid Open Patent Application (JP-A-Heisei 8-77127). In this reference, the system is composed of processors, relaying switches, a cross-bar switch, and a host computer or SVP. Each of the relaying switch and the cross-bar switch is composed of a route instruction circuit, a route data changing circuit, a by-pass instruction circuit and a coincidence determining circuit. For example, when an image is broadcast from a processor PE01, a broadcast message is transferred to a specific one (for example, 135) of the cross-bar switch based on the transfer control data in the message, and route data set for the relaying switch or cross-bar switch. When a fault has occurred in a partial network transferring one-to-one message, the message is transferred to the specific cross-bar switch and transferred from there.

Also, a congestion avoidance system is disclosed in Japanese Laid Open Patent Application (JP-A-Heisei 11-177573). In this reference, the system is composed of the following elements. That is, a transmission originator user network transmits transfer packets of an ATM. A destination user network is a destination of the transfer packets from the transmission originator user network. An average inflow speed measurement means measures an average inflow speed of the transfer packets which flows in from the transmission originator user network every destination of the transfer packet from the transmission originator user network. A first congestion detection means detects the first congestion generated when the total amount of the average inflow speed every transmission originator is larger than the transfer rate to the destination user network. A permission inflow speed calculation means calculates permission inflow speed as the average inflow speed of the transfer packets which flow in from the transmission originator user network based on the total amount of the average inflow speeds and the transfer rate. An inflow speed change means sets the average inflow speed of the packets which flows in from the transmission originator user network to a value lower than the permission inflow speed when the first congestion is detected by the first congestion detection means. A relay node relays the transfer packets which are sent and received between the transmission originator user network and the destination user network. An inner node congestion detection means detects inner node congestion generated when the transfer rate of the packets received in the receiving end of this relay node is larger than the transfer rate of the sender of this relay node. A second congestion detection means detects the second congestion generated when the inner node congestion is detected by the node congestion detection means of this inside and moreover the first congestion is not detected by the first congestion detection means. A transfer route database stores the transfer route data corresponding to the transfer from the transmission originator user network to the destination user network and shows a transfer route. A transfer route search means searches a transfer route from this transfer route database while excluding from the transfer route, the relay node in which the inner node congestion is detected by the inner node congestion detection means when second congestion is detected by the second congestion detection means. A transfer route control means carries out the transfer based on the transfer route searched by this transfer route search means.

Also, a data transfer unit is disclosed in Japanese Laid Open Patent Application (JP-A-2000-4247). In this reference, when a change request is generated for a route connection pattern, a CPU 108 selects a proper pattern identifier to avoid a fault by using an in-unit path 107 based on fault data, and rewrites a pattern identifier storage register 105. A route connection data control function section 104 reads out a pattern identifier fro the pattern storage register 105 by using a local bus 106. Next, the route connection data control function section 104 uses the local bus 106 to transfer a route connection data from the pattern storage register group 103 to route connection data storage register groups 171 to 180 in accordance with the pattern identifier. Output side switch contacts 161 to 170 carries out route connection based on data stored in the route connection data storage register groups 171 to 180.

SUMMARY OF THE INVENTION

Therefore, one object of the present invention is to provide a data transfer system which can avoid a loop on a transfer route.

Another object of the present invention is to provide a data transfer system which can carry out control so that no overlapped data may be transferred even if the transfer route is looped.

Still another object of the present invention is to provide a data transfer system which can determine another by-pass transfer route to enable the data transfer when any fault has occurred in any of data transfer units on the transfer route.

Yet still another object of the present invention is to provide a data transfer system which can carry out data transfer immediately after the failed route is recovered.

In an aspect of the present invention, a data transfer method between a plurality of data transfer apparatuses, is attained by establishing peers between the plurality of data transfer apparatuses to store the established peers in a transfer route configuration data table as transfer route configuration data in each of the plurality of data transfer apparatuses; and by transferring a reception data to specific ones of the plurality of data transfer apparatuses based on the transfer route configuration data in each of the plurality of data transfer apparatuses.

The establishing step may include the steps of distributing the transfer route configuration data from each of the plurality of data transfer apparatuses to the specific data transfer apparatuses; and updating the transfer route configuration data table based on the distributed transfer route configuration data in each of the plurality of data transfer apparatuses.

Also, the establishing step may include the steps of issuing an establishment request from one of the plurality of data transfer apparatuses to the other data transfer apparatuses for peers to be established; confirming whether a loop is produced, based on the transfer route configuration data in the transfer route configuration data table in each of the other data transfer apparatuses; and establishing the peer with the one data transfer apparatus when it is determined that the loop is not produced.

Also, the data transfer method may be attained further by discarding the reception data other than one in each of the plurality of data transfer apparatuses when a plurality of the reception data are received from ones of the plurality of data transfer apparatuses having the established peers.

Also, the data transfer method may be attained further by transmitting originator data indicating an originator of a transfer data from an originator one of the plurality of data transfer apparatuses; by receiving the transfer data with the originator data in each of the plurality of data transfer apparatuses; by referring to the transfer route configuration data in each of the plurality of data transfer apparatuses to determine whether the transfer data with the originator data is discarded in any of the plurality of data transfer apparatuses; and by in each of the plurality of data transfer apparatuses, discarding the transfer data with the originator data when it is determined that the transfer data with the originator data is not discarded, and transferring the transfer data with the originator data when it is determined that the transfer data with the originator data is discarded.

Also, the data transfer method may be attained by monitoring and detecting a fault of one of the established peers from no reception of new transfer route configuration data for a predetermined period of time, in each of the plurality of data transfer apparatuses; by establishing a by-pass peer newly based on the detection of the fault in the data transfer apparatuses relating to the fault; and by updating the transfer route configuration data in the transfer route configuration data table in the data transfer apparatuses relating to the fault. In this case, the data transfer method may further include the steps of: releasing the by-pass peer newly based on the detection of the fault in the data transfer apparatuses relating to the fault, when the peer is recovered; informing the transfer route configuration data to relating ones of the plurality of data transfer apparatuses; and updating the transfer route configuration data in the transfer route configuration data table in each of the relating data transfer apparatuses.

In another aspect of the present invention, a data transfer system includes a plurality of data transfer apparatuses, each of which comprises: a transfer route configuration data table and a control unit. The transfer route configuration data table stores transfer route configuration data indicating established peers in each of the plurality of data transfer apparatuses. The control unit establishes one peer with one of the other data transfer apparatuses as an association apparatus to update the transfer route configuration data based on the established peer.

The control unit transfers a reception data to the association apparatus based on the transfer route configuration data. Also, the control unit may receive the transfer route configuration data from the association apparatus and updates the transfer route configuration data based on the received transfer route configuration data.

Also, the control unit may receive an establishment request from a new one of the plurality of data transfer apparatuses, confirm whether a loop is produced, based on the transfer route configuration data, and establish the peer with the new data transfer apparatus when it is determined that the loop is not produced.

Also, the control unit may receive a transfer data from the plurality of data transfer apparatuses with which the peers are established, and discard the received data other than one when the received data are same and received from the plurality of data transfer apparatuses with which the peers are established.

Also, the control unit may transmit originator data indicating an originator of a transfer data, receives the transfer data with the originator data, refer to the transfer route configuration data to determine whether the transfer data with the originator data is discarded in any of the plurality of data transfer apparatuses, and discard the transfer data with the originator data when it is determined that the transfer data with the originator data is not discarded, and transfer the transfer data with the originator data when it is determined that the transfer data with the originator data is discarded.

Also, the control unit may monitor and detect a fault of one of the established peers from no reception of new transfer route configuration data for a predetermined period of time, establish a by-pass peer newly based on the detection of the fault in the data transfer apparatuses relating to the fault, and update the transfer route configuration data in the transfer route configuration data table in the data transfer apparatuses relating to the fault. In this case, the control unit may release the by-pass peer when the peer with the fault is recovered, informs the transfer route configuration data to indicate the recover of the peer with the fault, and update the transfer route configuration data when the information is received.

In another aspect of the present invention, a recording medium storing a program for a data transfer method between a plurality of data transfer apparatuses, wherein the method includes the steps of: establishing peers between the plurality of data transfer apparatuses to store the established peers in a transfer route configuration data table as transfer route configuration data in each of the plurality of data transfer apparatuses; and transferring a reception data to specific ones of the plurality of data transfer apparatuses based on the transfer route configuration data in each of the plurality of data transfer apparatuses.

DESCRIPTION OF THE PREFERRED EMBODIMENTS

Hereinafter, a data transfer system of the present invention will be described in detail with reference to the attached drawings.

In the present invention, (i) transfer route configuration data is exchanged between a plurality of data transfer units in order to avoid a loop in a data transfer route in the establishment of a transfer relation (hereinafter, to be referred to as "peer") between the data transfer units. Also, (ii) when the data transfer is carried out between a plurality of data transfer units and the same data are received through a plurality of peers, the data are discarded in accordance with a data discarding algorithm to avoid an overlapped transfer of the data. Also, (iii) when new transfer route configuration data is received through one of the peers and any data transfer unit to which the data received through the peer is to be transferred is not described in the transfer route configuration data, the transfer route is determined to have been changed and the same data received through another peer and discarded are changed to be transferred. Further, (iv) when no new transfer route configuration data is received within a predetermined period of time, or when any fault is detected in the peer, a new peer can be established in accordance with an alternative peer determining algorithm to establish a by-pass transfer route and to avoid faults. Moreover, (v) when the failed data transfer unit is recovered, the recovered data transfer unit transmits transfer route configuration data to a set peer, and when the data transfer unit having established the by-pass transfer route receives the configuration data, the data transfer unit releases the by-pass transfer route and establishes a peer again with the data transfer unit recovered from the fault, thereby returning to the condition before the fault.

Figure 1:
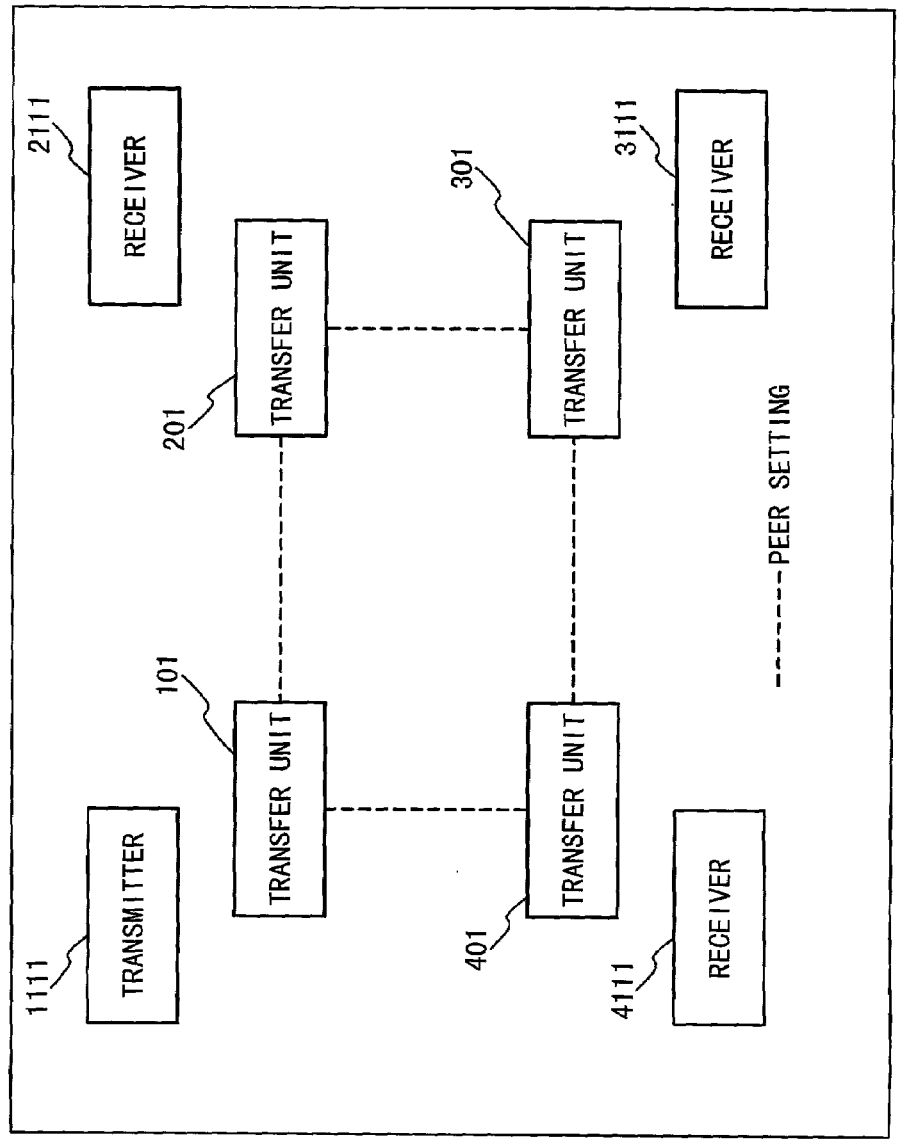
FIG. 1 is a block diagram showing a data transfer system using a plurality of data transfer units according to an embodiment of the present invention.

FIG. 1 shows a data transfer system using a plurality of data transfer units according to an embodiment of the present invention. Referring to FIG. 1, data transfer is carried out between four data transfer units 101, 201, 301 and 401. Each data transfer unit has a unique identifier. It is supposed that as an identifier, the data transfer unit 101 has R1, the data transfer unit 201 has R2, the data transfer unit 301 has R3, and the data transfer unit 401 has R4.

Figure 2:
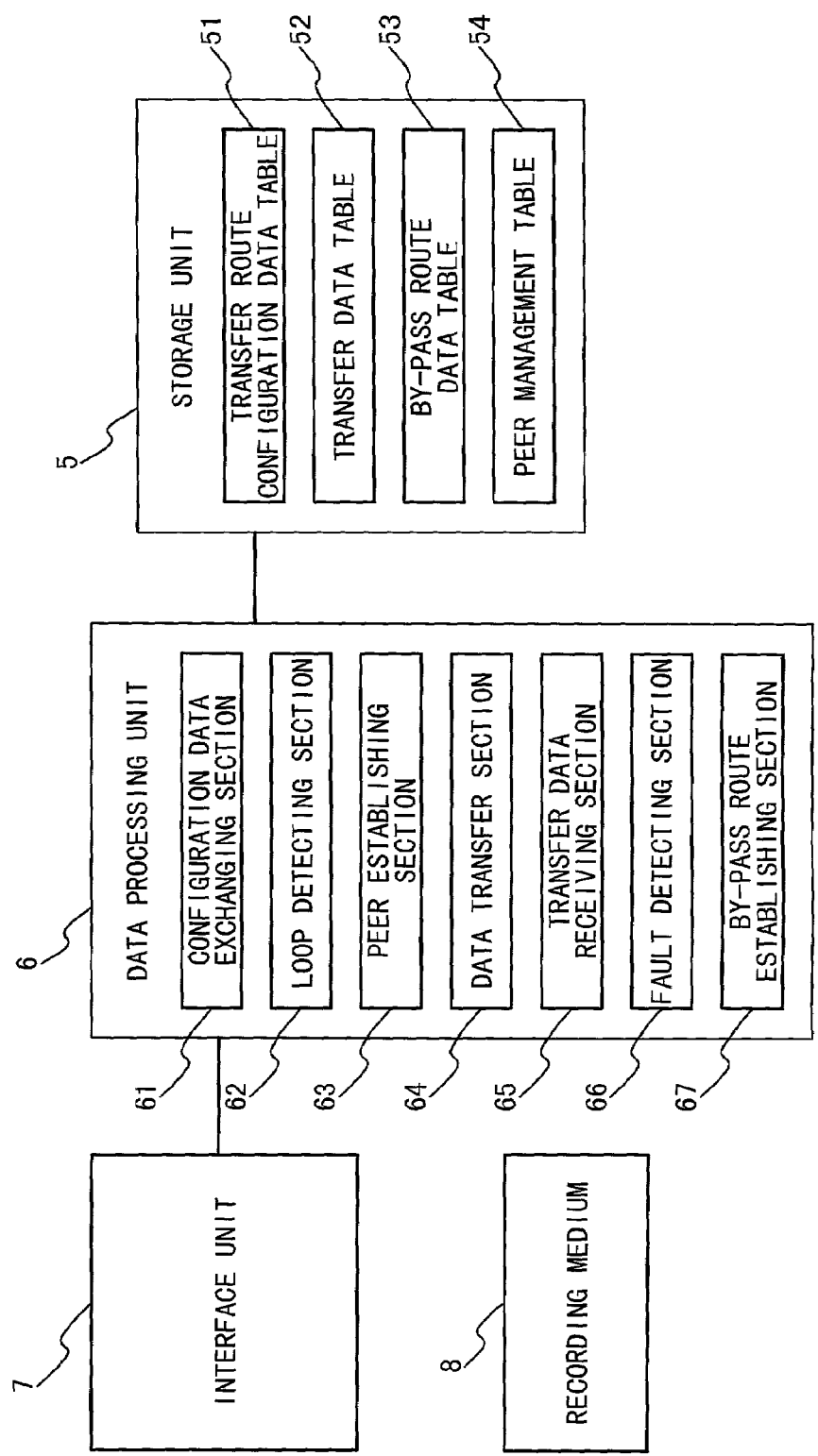
FIG. 2 is a block diagram showing the internal structure of one data transfer unit.

FIG. 2 shows the internal structure of one data transfer unit. Referring to FIG. 2, the data transfer unit is composed of an interface unit 7, a recording medium 8, a data processing unit 6 and a storage unit 5. The data processing unit 6 is composed of a configuration data exchanging section 61, a loop detecting section 62, a peer establishment processing section 63, a data transfer section 64, a transfer data receiving section 65, a fault detecting section 66 and a by-pass route establishing section 67.

These sections 61 to 67 execute various types of processing in accordance with a configuration data exchanging program, a loop detecting program, a peer establishing program, a data transferring program, a transfer data receiving program, a fault detecting program and a by-pass route establishing program, respectively. These programs are recorded in the recording medium 8. The programs recorded in the recording medium 8 are read into the data processing unit 6 for controlling the operation the data processing unit 6.

It should be noted that the recording medium 8 is a computer-readable recording medium according to the present invention. As this recording medium, various kinds of disk media such as magnetic recording media, and semiconductor memories can be used.

The interface unit 7 delivers data received from a network interface to the data processing unit 6. The storage unit 5 stores a transfer route configuration data table 51, a transfer data table 52, a by-pass route data table 53 and a peer management table 54, which are produced and changed by the data processing unit 6.

Now, the operation of the data transfer system in the first embodiment will be described.

(1) Avoidance of loop in a transfer route on the establishment of a peer

In FIG. 1, the data transfer unit 201 and the data transfer unit 401 are set for the data transfer unit 101 as counter data transfer units for peers to be established. Similarly, the data transfer unit 101 and the data transfer unit 301 are set for the data transfer units 201, the data transfer unit 201 and the data transfer unit 401 are set for the data transfer unit 301, and the data transfer unit 101 and the data transfer unit 301 are set for the data transfer unit 401 as counter data transfer units for peers to be established, respectively.

First, it is supposed that the data transfer units 101 and 401 are started. Initially, the data transfer unit 101 refers to the transfer route configuration data table 51 in the storage unit 5 to confirm its own transfer route configuration data. The data transfer unit 101 has a transfer route configuration data table 51 in which nothing is originally described. When confirming that the data transfer unit 401 is not described in the transfer route configuration data table 51, the data transfer unit 101 determines that no loop is produced on the transfer route even if the peer with the data transfer unit 401 is established.

Next, the data transfer unit 101 sends its own transfer route configuration data to the data transfer unit 401 together with a peer establishment request. At that time, the data transfer unit 101 transmits
 data transfer unit list R1 to the data transfer unit 401. R1 is the identifier of the data transfer unit 101.

The data transfer unit 401 compares the received list with its own transfer route configuration data in the table 51. The data transfer unit 401 has also a transfer route configuration data table 51 in which nothing is initially described. When confirming that the data transfer unit 101 is not described in its own transfer route configuration data table 51, the data transfer unit 401 determines that no loop is produced on the transfer route even if a peer with the data transfer unit 101 is established. Thus, the data transfer unit 401 accepts the peer establishment request from the data transfer unit 101, and transmits its own transfer route configuration data to the data transfer unit 101 and registers the information of
 peer R1 and data transfer unit list R1
 in its own transfer route configuration data table 51.

Then, the data transfer unit 101 establishes a peer with the data transfer unit 401 and registers the information of
 peer R4 and data transfer unit list R4 in its own transfer route configuration data table 51.

Similarly, transfer route configuration data are exchanged between the data transfer unit 101 and the data transfer unit 201 and between the data transfer unit 201 and the data transfer unit 301 in order to establish peers sequentially.

As a result, the transfer route configuration tables 51 of the respective data transfer units are as follow:
In the transfer route configuration data table 51 of the data
 transfer unit 101,
 peer R2 data transfer unit list R2, R3
 peer R4 data transfer unit list R4.
In the transfer route configuration data table 51 of the data
 transfer unit 201,
 peer R1 data transfer unit list R1, R4
 peer R3 data transfer unit list R3.
In the transfer route configuration data table 51 of the data
 transfer unit 301,
 peer R2 data transfer unit list R1, R2, R4.
In the transfer route configuration data table 51 of the data
 transfer unit 401,
 peer R1 data transfer unit list R1, R2, R3.

Finally, the data transfer unit 301 tries to establish a peer with the apparatus 401. However, the data transfer unit 301 detects that the data transfer unit 401 (R4) exists already in the data transfer unit list for the peer R2 of its own transfer route configuration data table 51. Therefore, the data transfer unit 301 determines that a loop is produced on the transfer route if a peer with the data transfer unit 401 is established. Therefore, the data transfer unit 301 stops the establishment of the peer. Similarly, the data transfer unit 401 establishes no peer with the data transfer unit 301.

(2) Avoidance of loop of overlapped data

The transfer route built as described above is shown in FIG. 3.

Now, the flow of data in FIG. 3 will be described. A sender 1111 transmits data to the data transfer unit 101. The address of the sender 1111 is S1. Receivers 2111, 3111 and 4111 receive data from the data transfer unit 201, 301 and 401.

The data transmitted from the sender 1111 are received by the data transfer unit 101. The data transfer unit 101 having received the data determines based on the peer management table 54 whether the data should be transferred to a peer. The data transfer unit 101 sends the data to a peer when it is determined that the data is to be transferred. The data transfer units 201 and 401 that have received the transferred data transmit the data to the receiver 2111 and the receiver 4111, respectively. At the same time, each of the data transfer units 201 and 401 determines based on the peer management table 54 whether the data should be transferred to the other peers. Each of the data transfer units 201 and 401 transfers the data similarly when it is determined that the data is to be transferred.

Figure 4:
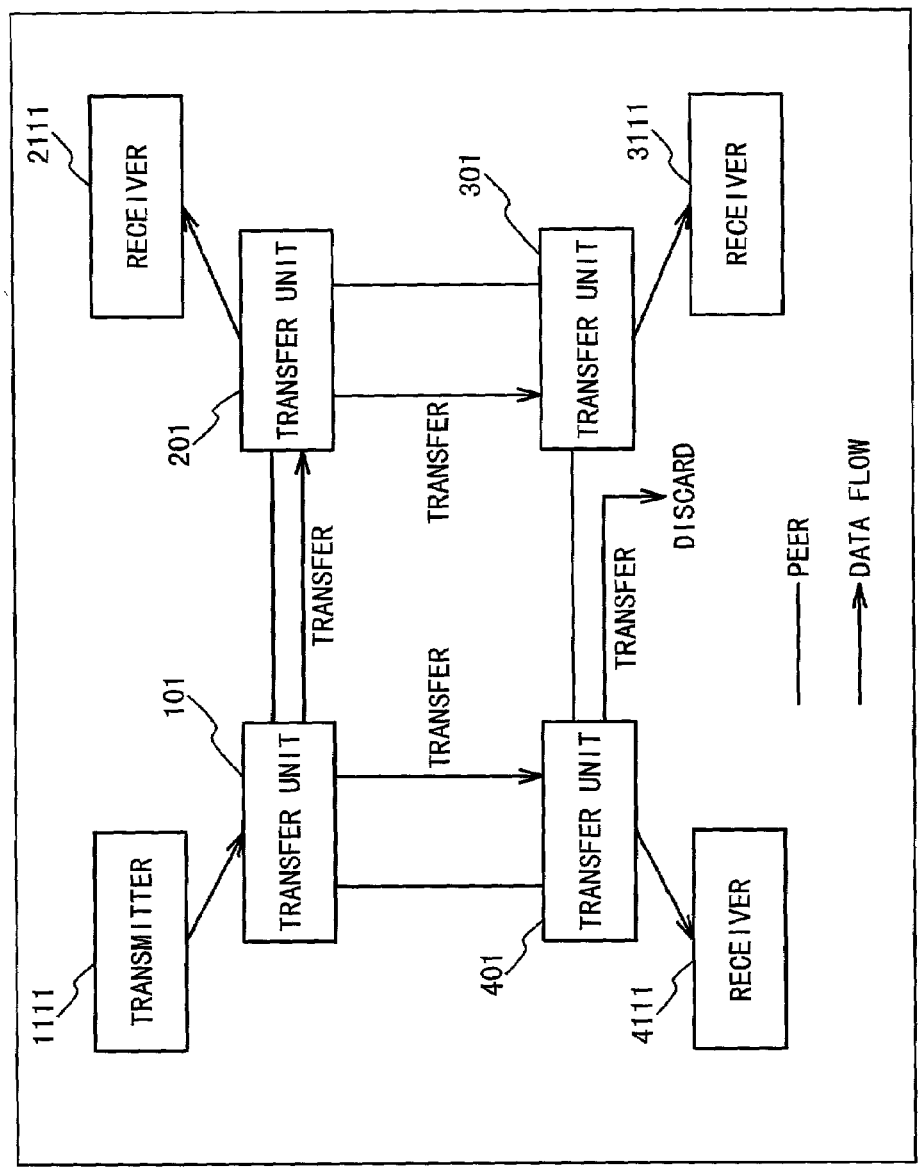
FIG. 4 is a block diagram showing the transfer route on which a loop is produced.

It is supposed that a peer has been established between the data transfer unit 301 and the data transfer unit 401 because of the delayed reception of the transfer route configuration data in exchanging the transfer route configuration data. In this case, a loop is produced on the transfer route, as shown in FIG. 4. In such a case, any of the data transfer units 201, 301 and 401 receives the same data transmitted from the data transfer unit 101 through two different peers.

For example, when the data transfer unit 301 has received the same transfer data from the data transfer unit 201 and the data transfer unit 401, the data received from either of the peers is not transferred to the other peers and discarded in accordance with the data discarding algorithm. In addition, the data received through the peer R2 is not transferred through the peer R4.

The data transfer unit 101 informs the other data transfer units in advance that the data transfer unit transferring data first is the data transfer unit 101. The other data transfer units record the information in the transfer data table 52.

Figure 5:
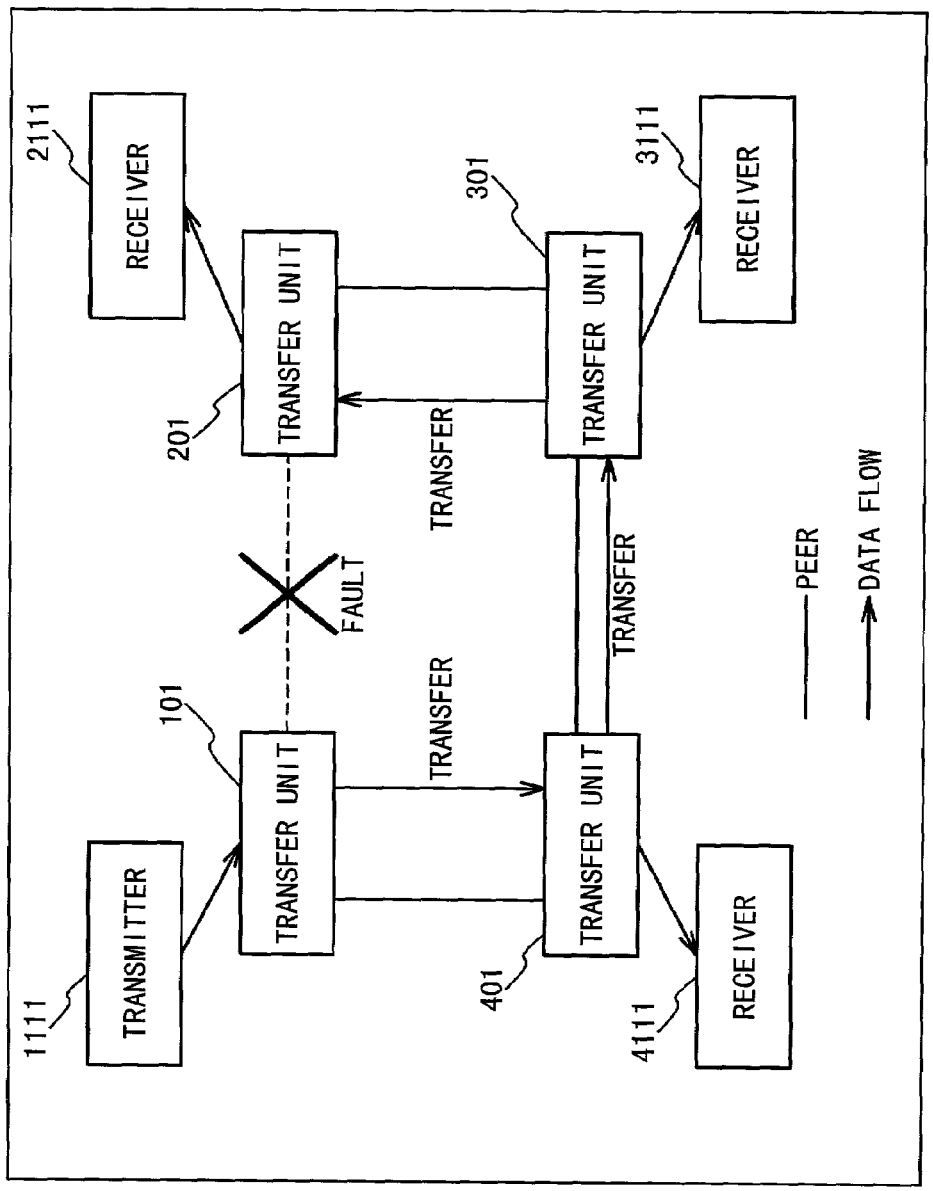
FIG. 5 is a block diagram showing the transfer route on which the peer between data transfer units 101 and 201 is disconnected.

When a fault has occurred between the data transfer unit 101 and the data transfer unit 201, the peer is disconnected. The peer condition at this time is as shown in FIG. 5. In this case, the identifier R1 of the data transfer unit 101 is not contained in the transfer route configuration data sent from the data transfer unit 201 to the data transfer unit 301. When the identifier R1 is not contained in the transfer route configuration data from the data transfer unit 201, the data transfer unit 301 determines that the data transfer unit 301 cannot receive the transfer data with the identifier R1 from the data transfer unit 201. Then, the data transfer unit 301 searches its own transfer information table 52 and checks if the transfer data with the identifier R1 has not been discarded in any other peer. If the data with the identifier R1 have been discarded in any other peer, the data transfer unit 301 changes the control in such a manner that the data with the identifier R1 is received through the peer and transferred through the other peers.

Subsequently, the data with the identifier R1 transferred through the peer R4 is transferred through the peer R2.

(3) Establishment of a by-pass transfer route in fault occurrence

In a condition shown in FIG. 3, the operation of establishing a by-pass transfer route in fault occurrence will be described. Referring to FIG. 3, each data transfer unit transmits periodically onto each peer, an identifier list indicating the data transfer units connected to the other peers. Each data transfer unit can confirm that the counter data transfer unit connected to each peer operates normally, by receiving the periodical transfer route configuration data.

Figure 3:
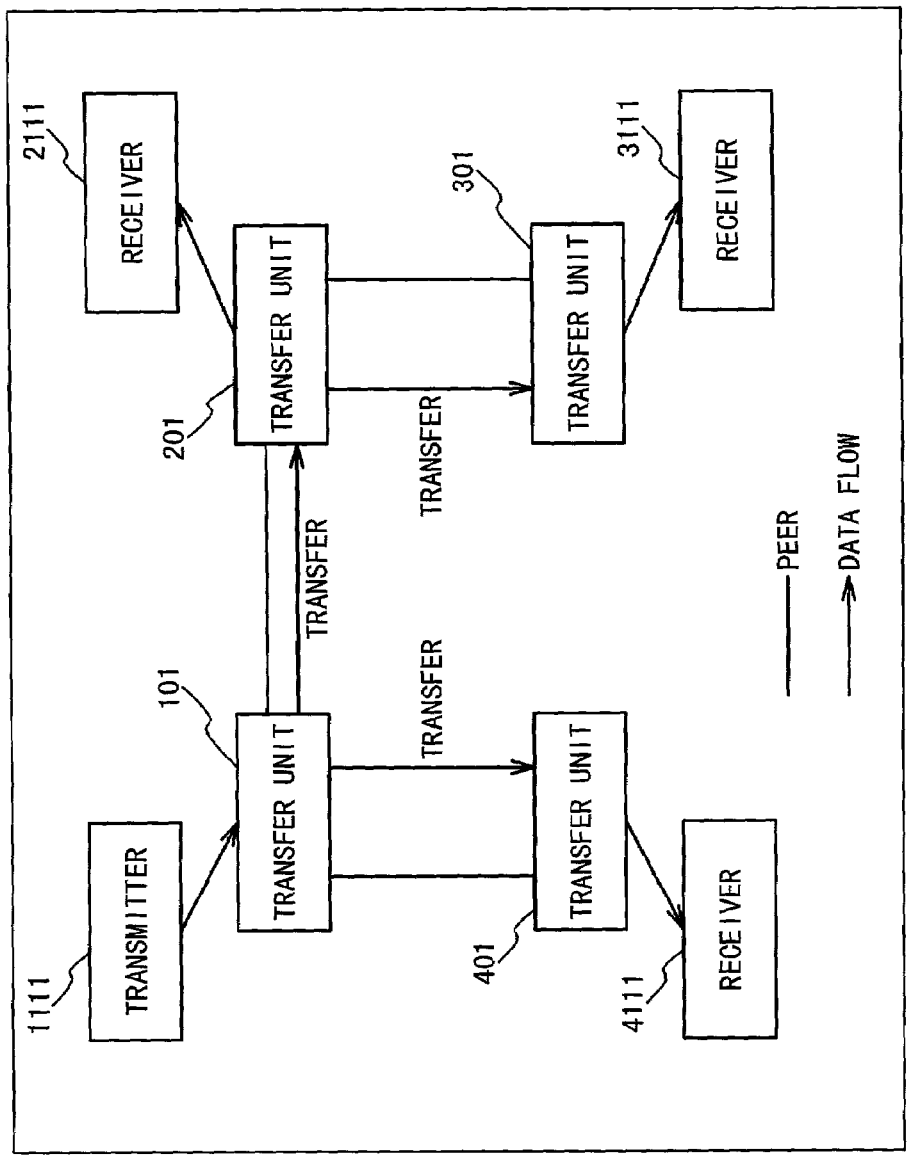
FIG. 3 is a block diagram showing the transfer route built after the peers are established.

In FIG. 3, the data transfer unit 201 transfers periodically data transfer unit lists R2, R3
to the data transfer unit 101, and
data transfer unit lists R2, R1, R4
to the data transfer unit 301.

When the operation of the data transfer unit 201 is stopped due to any fault, the data transfer unit 101 and 301 cannot receive transfer route configuration data from the data transfer unit 201 anymore. When having detected that there is no reception for a predetermined period of time, or having detected the fault occurrence of the data transfer unit 201 by a fault detecting section 65, each of the data transfer units 101 and 301 tries to establish a by-pass transfer route.

The data transfer unit 301 tries to establish a peer with another data transfer unit (in this case, the data transfer unit 101) in accordance with the alternative peer selection algorithm. When the peer with the data transfer unit 101 has been established, the data transfer unit 301 updates its own by-pass route information table 53.

The following data are registered in the by-pass route information table 53 of the data transfer unit 101:
fault peer: R2, alternative peer: R1.

Similarly, the following data is registered in the by-pass route information table 53 of the data transfer unit 101:
fault peer: R2, alternative peer: R3.

Figure 6:
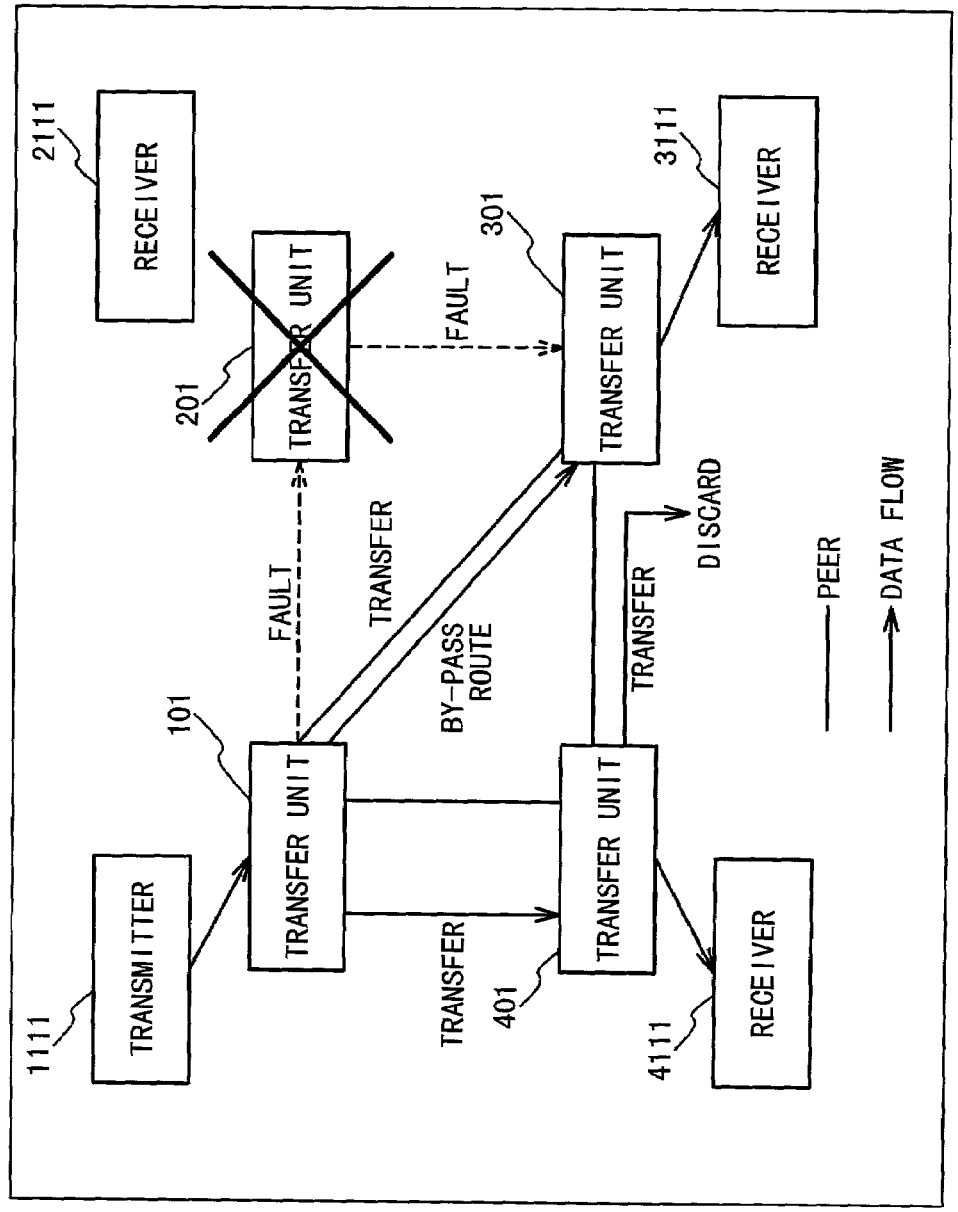
FIG. 6 is a block diagram showing a by-pass transfer route.

The configuration after the by-pass transfer route has been established is shown in FIG. 6.

Subsequently, when the data transfer unit 201 is recovered, the data transfer unit 201 transmits the transfer route configuration data to the data transfer units 101 and 301. The data transfer units 101 and 301 that have received the transfer route configuration data cancel the alternative peers, and establish peers with the data transfer unit 201. Thus, the configuration returns to the condition in FIG. 3.

According to the present invention, when a peer is established between a plurality of data transfer units, transfer route configuration data can be exchanged between them, thereby avoiding a loop produced on the transfer route.

Also, when the same data have been received through a plurality of peers, excess data are discarded and even if the loop is produced on the transfer route, the overlapped transfer of the data can be avoided.

Also, when new transfer route configuration data is received through one of the peers and the data transfer unit to which the data received through the peer is to be transferred is not described in the transfer route configuration data, it is determined that the transfer route has been changed. The transfer route configuration data is changed such that the same data received through another peer and discarded as described above are transferred. Thus, the data can be transferred reliably.

Moreover, when no new transfer route configuration data is received for a predetermined period of time, or when any fault is detected on the peer, a new peer can be established in accordance with an alternative peer determination algorithm in order to establish a by-pass transfer route so that the faults can be avoided.

Moreover, when the failed data transfer unit is recovered, the recovered data transfer unit transfers transfer route configuration data to a set peer, the data transfer unit having established the by-pass transfer route receives the configuration data. In this case, the data transfer unit having established the by-pass transfer route releases the by-pass transfer route and establishes a peer with the data transfer unit recovered from the fault again. Thus, the configuration condition can be returned to the one before the fault.

What is claimed is:

1. A data transfer method between a plurality of data transfer apparatuses, comprising the steps of:
    establishing peers between said plurality of data transfer apparatuses to store the established peers in a transfer route configuration data table as transfer route configuration data in each of said plurality of data transfer apparatuses; and
    transferring a reception data to specific ones of said plurality of data transfer apparatuses based on said transfer route configuration data in each of said plurality of data transfer apparatuses,
    wherein said establishing step includes the steps of
    issuing an establishment request from one of said plurality of data transfer apparatuses to the other data transfer apparatuses for peers to be established;
    confirming whether a loop is produced, based on said transfer route configuration data in said transfer route configuration data table in each of the other data transfer apparatuses; and
    establishing said peer with said one data transfer apparatus when it is determined that the loop is not produced.

2. The data transfer method according to claim 1, wherein said establishing step includes the steps of:
    distributing said transfer route configuration data from each of said plurality of data transfer apparatuses to said specific data transfer apparatuses; and
    updating said transfer route configuration data table based on said distributed transfer route configuration data in each of said plurality of data transfer apparatuses.

3. The data transfer method according to claim 1, further comprising the step of:
    discarding said reception data other than one in each of said plurality of data transfer apparatuses when a plurality of said reception data are received from ones of said plurality of data transfer apparatuses having the established peers.

4. The data transfer method according to claim 1, further comprising the steps of:
    monitoring and detecting a fault of one of the established peers from no reception of new transfer route configuration data for a predetermined period of time, in each of said plurality of data transfer apparatuses;
    establishing a by-pass peer newly based on the detection of the fault in said data transfer apparatuses relating to said fault; and
    updating said transfer route configuration data in said transfer route configuration data table in said data transfer apparatuses relating to said fault.

5. The data transfer method according to claim 4, further comprising the steps of:
    releasing said by-pass peer newly based on the detection of the fault in said data transfer apparatuses relating to said fault, when said peer is recovered;
    informing said transfer route configuration data to relating ones of said plurality of data transfer apparatuses; and
    updating said transfer route configuration data in said transfer route configuration data table in each of said relating data transfer apparatuses.

6. A data transfer method between a plurality of data transfer apparatuses, comprising the steps of:
    establishing peers between said plurality of data transfer apparatuses to store the established peers in a transfer route configuration data table as transfer route configuration data in each of said plurality of data transfer apparatuses;

transferring a reception data to specific ones of said plurality of data transfer apparatuses based on said transfer route configuration data in each of said plurality of data transfer apparatuses;

transmitting originator data indicating an originator of a transfer data from an originator one of said plurality of data transfer apparatuses;

receiving said transfer data with said originator data in each of said plurality of data transfer apparatuses;

referring to said transfer route configuration data in each of said plurality of data transfer apparatuses to determine whether said transfer data with said originator data is discarded in any of said plurality of data transfer apparatuses; and in each of said plurality of data transfer apparatuses, discarding said transfer data with said originator data when it is determined that said transfer data with said originator data is not discarded, and transferring said transfer data with said originator data when it is determined that said transfer data with said originator data is discarded.

7. The data transfer method according to claim 6, wherein said establishing step includes the steps of:

issuing an establishment request from one of said plurality of data transfer apparatuses to the other data transfer apparatuses for peers to be established;

confirming whether a loop is produced, based on said transfer route configuration data in said transfer route configuration data table in each of the other data transfer, apparatuses; and establishing said peer with said one data transfer apparatus when it is determined that the loop is not produced.

8. A data transfer system comprising:

a plurality of data transfer apparatuses, each of which comprises:

a transfer route configuration data table storing transfer route configuration data indicating established peers in each of said plurality of data transfer apparatuses; and a control unit which establishes one peer with one of the other data transfer apparatuses as an association apparatus to update said transfer route configuration data based on the established peer, wherein said control unit receives an establishment request from a new one of said plurality of data transfer apparatuses, confirms whether a loop is produced, based on said transfer route configuration data, and establishes said peer with said new data transfer apparatus when it is determined that the loop is not produced.

9. The data transfer system according to claim 8, wherein said control unit transfers a reception data to said association apparatus based on said transfer route configuration data.

10. The data transfer system according to claim 8, wherein said control unit receives said transfer route configuration data from said association apparatus and updates said transfer route configuration data based on said received transfer route configuration data.

11. The data transfer system according to claim 8, wherein said control unit receives a transfer data from said plurality of data transfer apparatuses with which said peers are established, and discards said received data other than one when said received data are same and received from said plurality of data transfer apparatuses with which said peers are established.

12. The data transfer system according to claim 8, wherein said control unit monitors and detects a fault of one of the established peers from no reception of new transfer route configuration data for a predetermined period of time, establishes a by-pass peer newly based on the detection of the fault in said data transfer apparatuses relating to said fault, and updates said transfer route configuration data in said transfer route configuration data table in said data transfer apparatuses relating to said fault.

13. The data transfer system according to claim 12, wherein said control unit releases said by-pass peer when said peer with said fault is recovered, informs said transfer route configuration data to indicate the recover of said peer with said fault, and updates said transfer route configuration data when the information is received.

14. A data transfer system comprising:

a plurality of data transfer apparatuses, each of which comprises a transfer route configuration data table storing transfer route configuration data indicating established peers in each of said plurality of data transfer apparatuses; and a control unit which establishes one peer with one of the other data transfer apparatuses as an association apparatus to update said transfer route configuration data based on the established peer, wherein said control unit transmits originator data indicating an originator of a transfer data, receives said transfer data with said originator data, refers to said transfer route configuration data to determine whether said transfer data with said originator data is discarded in any of said plurality of data transfer apparatuses, and discards said transfer data with said originator data when it is determined that said transfer data with said originator data is not discarded, and transfers said transfer data with said originator data when it is determined that said transfer data with said originator data is discarded.

15. The data transfer system according to claim 14, wherein said control unit receives an establishment request from a new one of said plurality of data transfer apparatuses, confirms whether a loop is produced, based on said transfer route configuration data, and establishes said peer with said new data transfer apparatus when it is determined that the loop is not produced.

16. A recording medium storing a program for a data transfer method between a plurality of data transfer apparatuses, wherein said method comprises the steps of:

establishing peers between said plurality of data transfer apparatuses to store the established peers in a transfer route configuration data table as transfer route configuration data in each of said plurality of data transfer apparatuses; and transferring a reception data to specific ones of said plurality of data transfer apparatuses based on said transfer route configuration data in each of said plurality of data transfer apparatuses, wherein said establishing step includes the steps of issuing an establishment request from one of said plurality of data transfer apparatuses to the other data transfer apparatuses for peers to be established;

confirming whether a loop is produced, based on said transfer route configuration data in said transfer route configuration data table in each of the other data transfer apparatuses; and establishing said peer with said one data transfer apparatus when it is determined that the loop is not produced.

17. The recording medium according to claim 16, wherein said establishing step includes the steps of:

informing means said transfer route configuration data from each of said plurality of data transfer apparatuses to said specific data transfer apparatuses; and updating said transfer route configuration data table based on said distributed transfer route configuration data in each of said plurality of data transfer apparatuses.

18. The recording medium according to claim 16, wherein said method further comprises the step of:

discarding said reception data other than one in each of said plurality of data transfer apparatuses when a plurality of said reception data are received from ones of said plurality of data transfer apparatuses having the established peers.

19. The recording medium according to claim 16, wherein said method further comprises the steps of:

monitoring and detecting a fault of one of the established peers from no reception of new transfer route configuration data for a predetermined period of time, in each of said plurality of data transfer apparatuses;

establishing a by-pass peer newly based on the detection of the fault in said data transfer apparatuses relating to said fault; and updating said transfer route configuration data in said transfer route configuration data table in said data transfer apparatuses relating to said fault.

20. The recording medium according to claim 19, wherein said method further comprises the steps of:

releasing said by-pass peer newly based on the detection of the fault in said data transfer apparatuses relating to said fault, when said peer is recovered;

informing said transfer route configuration data to relating ones of said plurality of data transfer apparatuses; and updating said transfer route configuration data in said transfer route configuration data table in each of said relating data transfer apparatuses.

21. A recording medium storing a program for a data transfer method between a plurality of data transfer apparatuses, wherein said method comprises the steps of:

establishing peers between said plurality of data transfer apparatuses to store the established peers in a transfer route configuration data table as transfer route configuration data in each of said plurality of data transfer apparatuses; and transferring a reception data to specific ones of said plurality of data transfer apparatuses based on said transfer route configuration data in each of said plurality of data transfer apparatuses, wherein said method further comprises the steps of:

transmitting originator data indicating an originator of a transfer data from an originator one of said plurality of data transfer apparatuses;

receiving said transfer data with said originator data in each of said plurality of data transfer apparatuses;

referring to said transfer route configuration data in each of said plurality of data transfer apparatuses to determine whether said transfer data with said originator data is discarded in any of said plurality of data transfer apparatuses; and in each of said plurality of data transfer apparatuses, discarding said transfer data with said originator data when it is determined that said transfer data with said originator data is not discarded, and transferring said transfer data with said originator data when it is determined that said transfer data with said originator data is discarded.

22. The recording medium according to claim 21, wherein said establishing step includes the steps of:

issuing an establishment request from one of said plurality of data transfer apparatuses to the other data transfer apparatuses for peers to be established;

confirming whether a loop is produced, based on said transfer route configuration data in said transfer route configuration data table in each of the other data transfer apparatuses; and establishing said peer with said one data transfer apparatus when it is determined that the loop is not produced.

* * * * *